United States Patent [19]

Stack et al.

[11] Patent Number: 4,936,146

[45] Date of Patent: Jun. 26, 1990

[54] METHOD AND APPARATUS FOR DETECTING LAMINAR FLOW SEPARATION AND REATTACHMENT

[75] Inventors: John P. Stack, Yorktown; Sivaramakrishnan M. Mangalam, Hampton, both of Va.

[73] Assignee: The United States of America as represented by the Administrator of the National Aeronautics and Space Administration, Washington, D.C.

[21] Appl. No.: 348,223

[22] Filed: May 4, 1989

Related U.S. Application Data

[62] Division of Ser. No. 203,178, Jun. 7, 1988, Pat. No. 4,848,153.

[51] Int. Cl.$^5$ .............................................. G01F 1/00
[52] U.S. Cl. ................................................... 73/432.1
[58] Field of Search ............ 73/432.1, 204.11, 204.14, 73/204.17, 204.18, 204.19, 204.23, 204.25, 204.26; 374/45

[56] References Cited

U.S. PATENT DOCUMENTS 4,154,100  5/1979  Harbaugh et al. ............... 73/861.66
4,739,657  4/1988  Higashi et al. ................... 73/204.18

OTHER PUBLICATIONS

Manuel et al., "The Laminar Separation Sensor: An Advanced Transition Measurement Method for Use in Wind Tunnels and Flight", SAE Technical Paper Series, presented Apr. 28-30, 1987.

Primary Examiner—Robert R. Raevis
Attorney, Agent, or Firm—Harold W. Adams; John R. Manning; Charles E. B. Glenn

[57] ABSTRACT

The invention is a method and apparatus for simultaneously detecting laminar separation and reattachment of a fluid stream such as an airstream from and to the upper surface of an airfoil 22 by simultaneously sensing and comparing a plurality of output signals S, each representing the dynamic shear stress at one of an equal number of sensors 27 spaced along a straight line on the surface of the airfoil 22 that extends parallel to the airstream. The output signals S are simultaneously compared to detect the sensors across which a reversal in phase of said output signal S occurs, said detected sensors being in the region of laminar separation or reattachment.

9 Claims, 6 Drawing Sheets

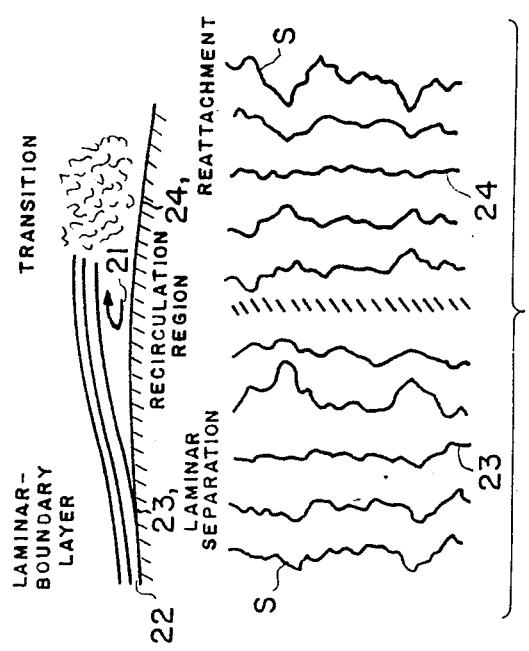
FIG. 10
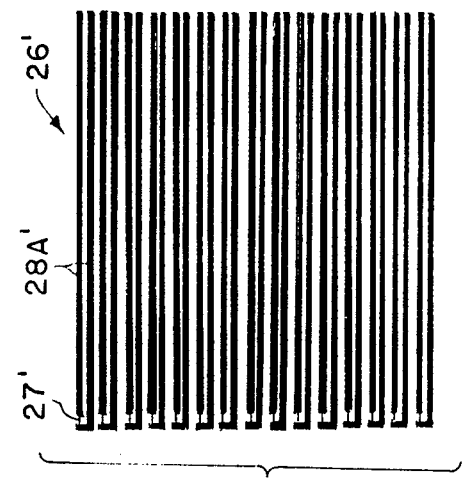
FIG. 4
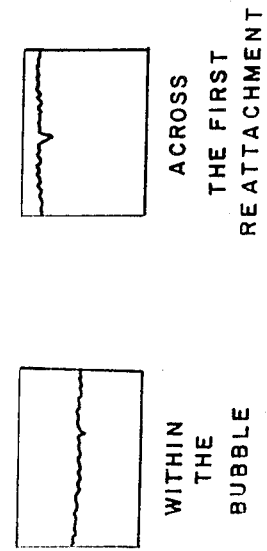
FIG. 11(d)
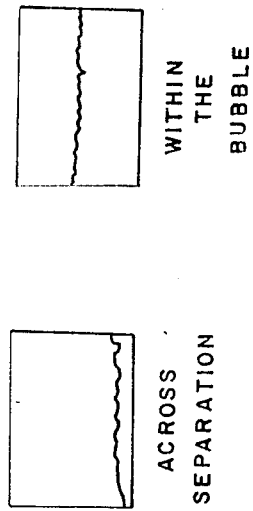
FIG. 11(c)
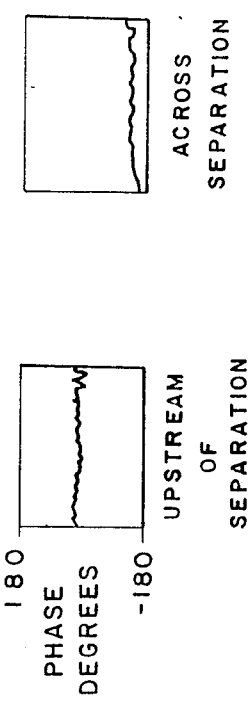
FIG. 11(b)
FIG. 11(a)

METHOD AND APPARATUS FOR DETECTING LAMINAR FLOW SEPARATION AND REATTACHMENT

ORIGIN OF INVENTION

The invention described herein was jointly made in the performance of work under a NASA Contract and an employee of the United States Government. In accordance with 35 U.S.C. 202, the contractor elected not to retain title.

This is a division of application Ser. No. 07/203,178, filed Jun. 7, 1988 now U.S. Pat. No. 4,848,153.

BACKGROUND OF THE INVENTION

1. Field of the invention

The invention relates to method and apparatus for detecting laminar flow separation and reattachment and more particularly to a nonintrusive method and apparatus for simultaneously detecting laminar flow separation and reattachment by sensing the phase reversal of low frequency dynamic shear stress signals in the respective regions of separation and reattachment.

2. Description of the prior art

It is known that laminar flow separation is a major cause of the rapid flow deterioration of airfoil aerodynamic performance characteristics at low-chord Reynolds numbers, Rec, (Rec<$10^6$). At such low-chord Reynolds numbers, the flow boundary layer is generally stable and the presence of an adverse pressure gradient, as in the rear-pressure rise area, may result in a laminar separation with or without turbulent reattachment. In the absence of externally forced disturbances such as suction, blowing or turbulators, the separation can and frequently does extend back to the trailing edge of the airfoil resulting in a large pressure drag on the airfoil or wing surface.

Typically, a laminar separation bubble occurs when a turbulent reattachment takes place upstream of the airfoil trailing edge and downstream of the separation. The extent of the separation, the laminar region within the resulting bubble, depends on several factors, including the boundary-layers at separation, freestream turbulence, airfoil surface roughness, and other sources of disturbances that cause shear-layer transition. An understanding of the physical characteristics of laminar flow-separation bubbles is required to detect and ultimately control or eliminate undesirable laminar flow separation over air foils.

There are a number of known techniques for detecting laminar flow separation that make use of single point measurement instruments such as hot-wire anemometers and pitot tubes. Such instruments, because of the streamwise extent of laminar separation bubbles which can vary from a fraction of a percent to several tenths of the airfoil chord length and of their small height which is usually a small fraction of a percent chord, may be unsuitable as the internal sensors disturb the flow and other characteristics of the bubble detected leading to inaccurate measurements.

Flush mounted or buried hot-film or wire gages on or within the exposed airfoil surface for detecting transition and generally separation are also known. This type of sensor involves three spaced separate temperature responsive elements thus requiring a minimum spacing between the elements to avoid undesirable heat conduction on or through the substrate and airfoil surface. The heat conduction between the elements and through the substrate may be as great as the heat convection in the thin-shear stress layer at or near the wall formed within the bubble at the upstream point or line of separation.

Another technique, which is non intrusive, makes use of a laser velocimeter for sensing the velocity of moving particles within the laminar separation bubble. The accuracy of this instrument is dependent upon a sufficient number of particles in the laser control volume as they traverse through the separation bubble. Also low frequency shedding may occur affecting the accuracy of the resulting bubble measurements.

Typically, conventional hot film sensors may be arranged in arrays, the sensors being disposed in a line extending along the wing span transverse to the direction of air flow over the wing surface. Suitable electronic instrumentation is provided to interrogate each sensor in the array in seriation, thus detecting a line of laminar flow separation points that extends substantially along the span of the airfoil or wing but giving no indication of an exact point of separation and reattachment of a resulting separation causing the separation bubble along a line parallel to the flow of the airstream.

SUMMARY OF THE INVENTION

An object of the invention is to provide method and apparatus for detecting the laminar flow separation and reattachment of a fluid stream over a surface by sensing the phase reversal of dynamic shear stress signals that occur in the respective regions of separation and reattachment.

Another object of the invention is to provide method and means for detecting the laminar flow separation and reattachment of a fluid stream over an air foil by simultaneously sensing the phase reversal of low frequency dynamic shear stress signals across one or more of a plurality of separate sensor points unique to the respective points of separation and reattachment and extending in a line substantially parallel with the fluid stream.

A further object is to provide a multi-element sensor array for practicing the method of this invention in which all connecting leads to said sensor points are brought out to the trailing edge of the airfoil upon which said sensor points are mounted.

Still another object of the invention is to provide a multi-element sensor array for practicing the method of the invention in which all connecting leads to said sensor points are brought out to the same side of the airfoil upon which said sensors are mounted.

The above and numerous other objects and advantages may be achieved by the method of this invention which may include the steps of passing an air stream over an airfoil or other surface under conditions known to cause laminar separation from and reattachment to along the chord of said airfoil; simultaneously sensing at and generating a variable low-frequency output signal from each of a plurality of selected sensor points spaced along the chord of said airfoil in a straight line that extends parallel to the direction of flow of said fluid stream, said output signals representing the dynamic shear stress at each of said selected sensor points and differing distinctly only in phase; and simultaneously comparing said variable frequency output signals from said spaced sensor points to determine at what if any sensor point or points a phase reversal in said output signals occurs, said point or points at which said phase reversal occurs representing the point or points of flow separation and reattachment of said fluid stream from and to said airfoil.

The multi-element sensor may be a plurality of hot-film sensors spaced in a straight line array on the airfoil or on a parallel panel or substrate arranged for mounting on the airfoil with the connecting leads from the hot film sensors brought out to the trailing edge or to a side of the airfoil when positioned thereon. The hot-film sensors are connected to constant temperature anemometers, the output signals from which are connected to suitable instrumentation such as an oscillograph recorder and an analog tape recorder to simultaneously display the resulting variable low frequency output signals from the spaced hot film sensors.

BRIEF DESCRIPTION OF THE DRAWINGS

The above and numerous other objects and advantages that may be achieved by the method and a preferred means of the invention will become apparent from the following detailed description when read in view of the appended drawings wherein:

FIG. 4 is a plan view of an alternative embodiment of a multi-element hot-film sensor that maybe used to practice the method of the invention:

FIG. 10 illustrates a plurality of variable, low frequency output signals from spaced hot-film sensors obtained in accordance with the invention shown relative to a pictorial illustration of a typical laminar flow separation from and reattachment to an airfoil; and FIGS. 11 a–d are phase diagrams illustrating the phase difference between output signals from sensors located in the laminar separation and reattachments regions.

BRIEF DESCRIPTION OF THE INVENTION

Figure 2:
FIG. 2 is an enlarged, more detailed representation of the laminar flow separation bubble of FIG. 1.
Figure 1:
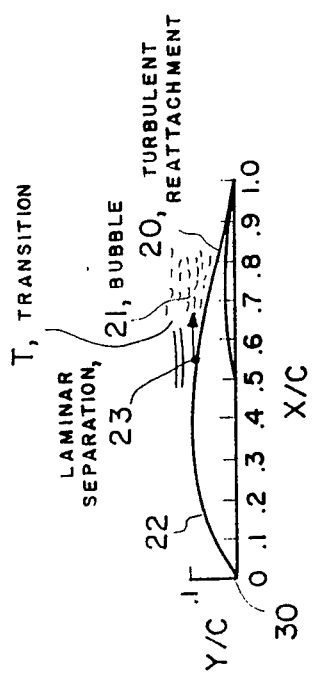
FIG. 1 illustrates a typical flow separation bubble along the chord of an airfoil.

Referring to the drawings, FIG. 1 pictorially illustrates a typical laminar separation bubble 21 formed when laminar separation from and reattachment to a typical air foil 22 having a 6-inch chord that may occur during wind tunnel tests and actual flight conditions. FIG. 2 illustrates the laminar separation bubble 21 and its points of separation and reattachment 23 and 24 respectively in greater detail.

Figure 3B:
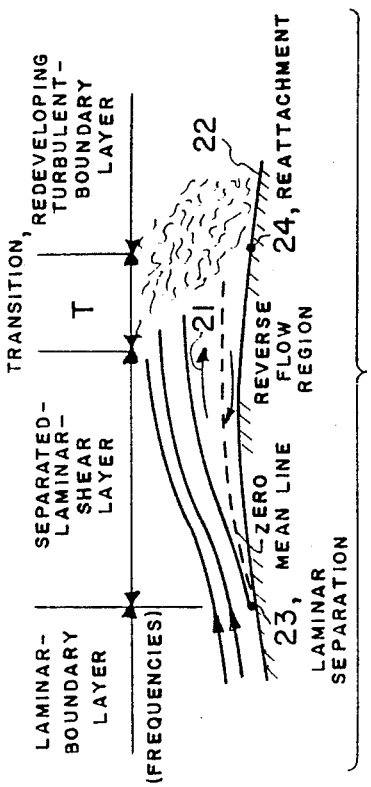
FIGS. 3(a) and (b) are plan views of a preferred multi-element hot-film sensor that maybe used to practice the method of the invention.
Figure 3A:
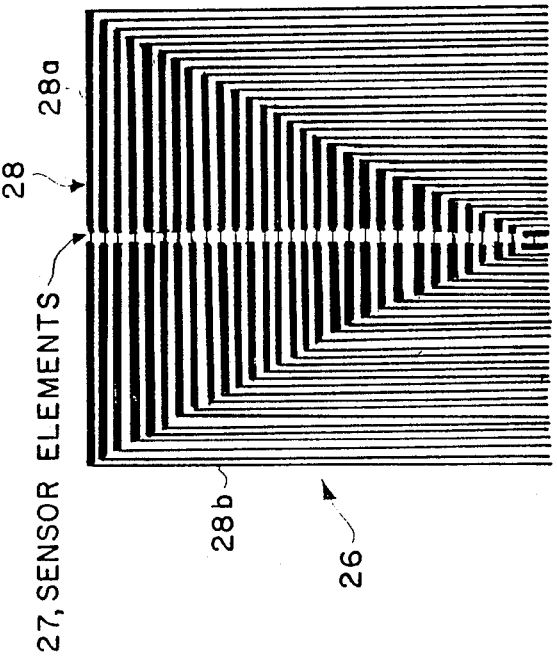

A preferred embodiment of a multi-element sensor generally designated by the reference numeral 26 in accordance with the invention is shown in FIGS. 3(a) and (b) for making simultaneous, non-intrusive measurements of the fluctuating shear stress within the laminar separation bubble 21 along a straight line that extends in parallel with the direction of air flow over the airfoil 22.

As shown the multi-element sensor 26 includes thirty hot-film temperature responsive sensor elements 27 equally spaced along a straight line that when the sensor 26 is mounted on the airfoil 22 the straight line formed by the spaced, parallel elements 27 extends parallel with the direction of air flow over the airfoil 22.

Each sensor element 27 is formed of a nickel film that may be electron-beam evaporated on a thin (0.002 inch) non-conductive polyimide substrate applied as a panel directly upon the surface of the airfoil 22 over which laminar separation conditions may occur. As shown, in greater detail in FIG. 3(b), the sensor elements 27 are disposed in a straight line array.

In a preferred embodiment used for practicing the method of this invention and as determined by the test conditions, each of the nickel hot-film sensor elements 27 may be approximately 0.040-inch in length, 0.005-inch in width, 0.00001-inch in thickness and equally spaced from each other 0.1-inch. The resistance of each element 27 may be a nominal 5-ohms typically.

Copper-coated nickel film conductive leads 28 are connected to the ends of the elements 27, a first portion 28a being 0.0002-inch thick and 0.04-inch wide extending transversely of the straight line formed by the spaced elements 27 and a second portion 28b being 0.02-inch wide and of the same thickness extending parallel to the straight line formed by the sensing elements 27 to the trailing edge of the airfoil 22. The leads 28 a and b may be formed so that their combined resistance value is substantially the same value when connected to each sensor 27.

An alternate embodiment of a multi-element sensor 26', which may include thirty or more hot-film elements 27' arranged in a straight line array and which are identical in dimension to the elements 27 and operate in the same manner is shown in FIG. 4. In this arrangement all conductive leads 28a are connected to the elements 27' and brought out to the side of the airfoil 22' instead of its trailing edge as with the preferred embodiment. The leads 28 A are all of the same dimensions and of the same resistance value.

Each hot-film sensor element 27 or 27' is maintained at a determined temperature above that of the surface of the airfoil 22 by means of a conventional constant temperature anemometer 29 which as well known senses and provides an output signal S representative of the change of resistance of each element 27 or 27' caused by fluctuating shear stress within the laminar flow separation bubble 21. All output signals S from the respective elements 27 or 27' are measured simultaneously as will be explained permitting the detection of any laminar flow separation and reattachment along the chord of the airfoil 22. This is an important and novel distinguishing feature over the conventional use of three-element hot-film laminar flow separation sensors which requires the center element of the three element sensor to be positioned in the separation and reattachment regions before detection can be achieved measurements.

As laminar flow separation and reattachment detection achieved by the invention is substantially unaffected by thermal conduction between the elements 27, either in the airstream over the airfoil 22 or through the substrate and airfoil surface upon which mounted, the output signals S from the anemometers 29 are substantially unaffected by noise which appreciably degrades the effectiveness of conventional three element hot-film sensors.

When the multi-element sensor 26 or 26' is affixed to the 6-inch chord of the airfoil 22 as shown in FIGS. 1 and 2, simultaneous temperature or shear stress measurements are made at each sensing element 27 or 27' at 1.66 percent chord intervals from 0.45 chord to 0.95 chord where percent chord is determined by the distance of the respective sensing elements 27 from the leading edge 30 of the airfoil 22 as the total chord length—in this instance 6-inches.

Figure 5:
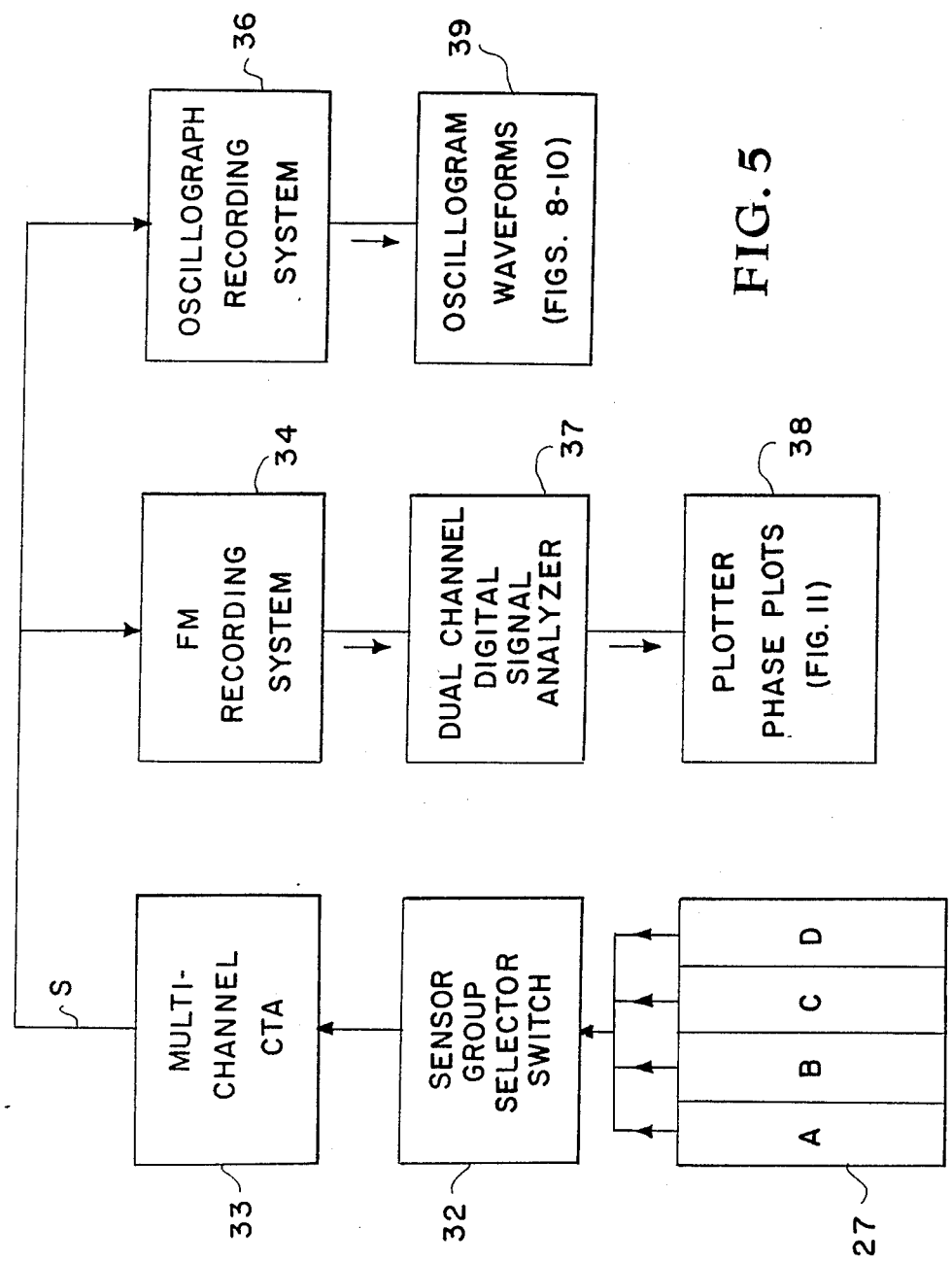
FIG. 5 is an electrical schematic of a preferred laminar flow detection system for practicing the invention.

As shown in FIG. 5, the thirty elements 27 or 27' may be arranged in three groups of eight elements A, B, and C, and one of six elements D. The sensors 27 or 27' from each group A–D are simultaneously connected by groups selected in serriation by a multi-channel group selector switch 32 to a conventional multi-channel constant temperature anemometer panel 33 with sufficient channels to simultaneously measure the change of heating current of each sensor element 27 or 27' in each selected group A–D and provide low frequency output signals S from each sensor element 27 or 27'. The low frequency output signals S from each group A–D are simultaneously connected to both a conventional FM recording system 34 and a conventional oscillograph recording system 36. The FM recording system includes a multiple track magnetic recording system and peripheral electrical conditioning circuitry to amplify, filter, monitor and record the low frequency output signals for post analysis, A dual channel digital signal analyzer 37 performs a frequency domain analysis of the processed output signals S from the FM recording system with a suitable fast Fourier transform algorithm to determine the phase and coherence relations between the output signals S from any two selected sensors 27 or 27'. A conventional plotter 38 connected to the digital signal analyzer 37 provides hard copy graphic records of the analyzed phase data as shown in FIG. 11.

Figure 8:
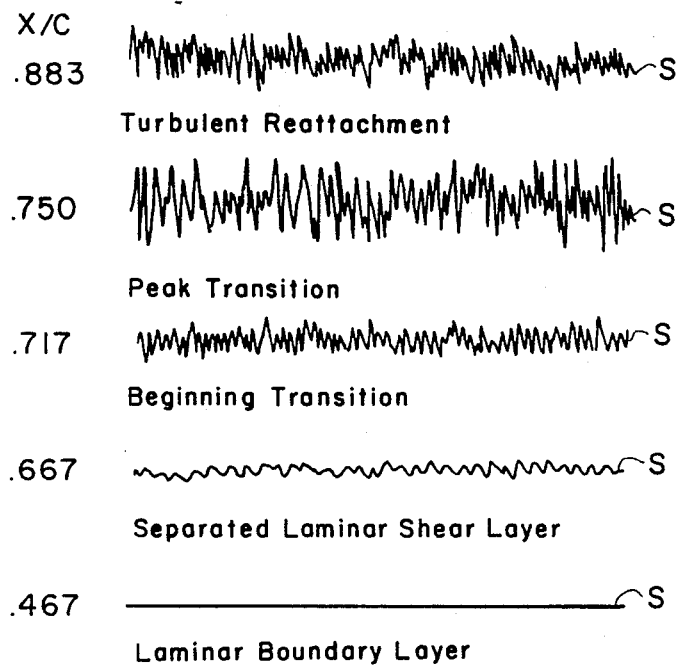
FIG. 8 is a series of variable wide-band frequency output signals representing dynamic shear stress at each of a plurality of hot-film sensor points spaced along a straight line on the chord of the same test airfoil.
Figure 9:
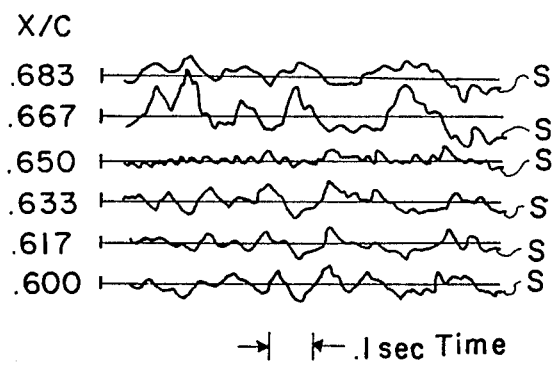
FIG. 9 is a series of enlarged variable low frequency output signal from a plurality of hot-film sensors on either side of a laminar flow separation on the test airfoil at a known chord reynolds number and angle of attack.

The oscillograph recording system 36 provides on-line (as opposed to post analysis) and simultaneous graphic time history wave form recording of each group of sensors A–D in succession to produce the wave forms shown in FIGS. 8–10 at oscillograph 39.

In the preferred embodiment the thirty elements 27 or 27' forming each multi-element sensor 26 or 26' are divided in groups which are successively connected by selected groups A–D to the constant temperature anemometer panel 33. However, it is understood all thirty of the elements 27 or 27' in either multi-element sensor 26 or 26' can be simultaneously connected to an equal number of constant temperature anemometers 29 in a suitable panel 33. It is also to be understood a plurality of multi-element sensors 26 or 26' may also be spaced along the span of the airfoil and the outputs S from an associated CTA panels 33 processed as previously described in succession or simultaneously.

Figure 6:
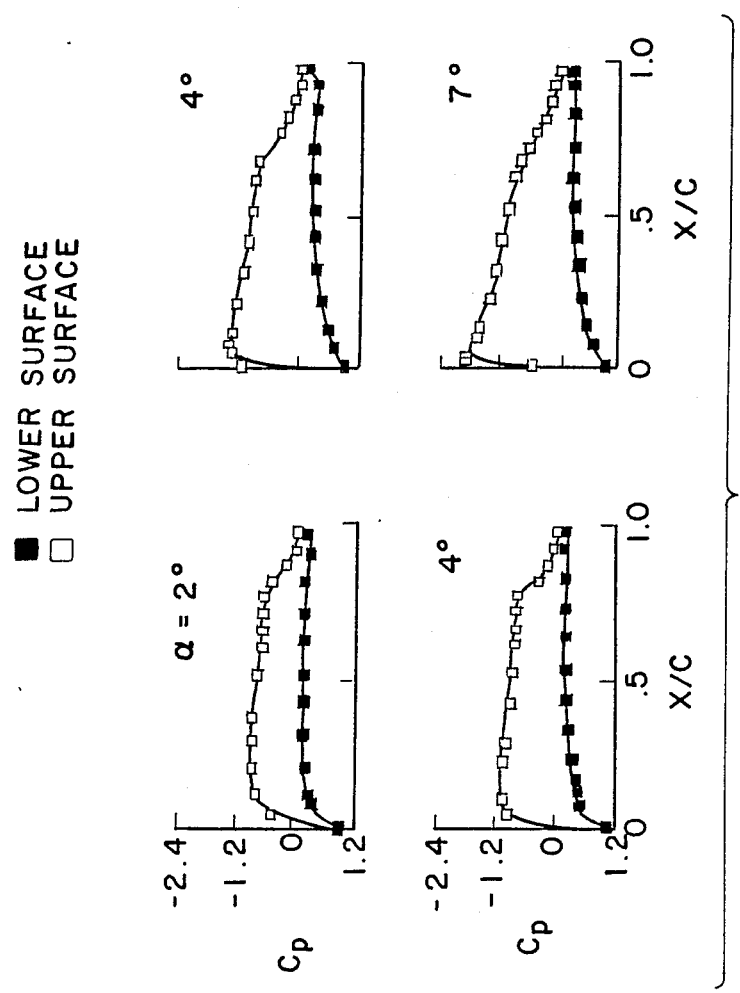
FIG. 6 is a series of diagrams illustrating the variation in pressure distribution over an airfoil at different angles of attack and at a constant chord-Reynolds number over a test airfoil.

Tests of the multi-element sensors 26 and 26' on the 6-inch airfoil 22 shown in FIG. 1 in a low speed wind tunnel at Langley Research Center under known freestream turbulence levels revealed the upper and lower airfoil surface pressure distribution curves to be as shown in the series of diagrams illustrated in FIG. 6 where $C_p$ represents a non-dimensional pressure coefficient and X/C is the non dimensional distance of the sensing elements 27 or 27' from the leading edge 30 as a fraction of the 6-inch chord length.

As shown in FIG. 6, the upper surface pressure distribution on the airfoil 22 at moderate angles of attack has a suction peak near the leading edge 30 followed by a gentle positive pressure gradient up to about 65-percent chord where the main pressure recovery is initiated. At angles of attack lower than about 6°, laminar separation occurs near 65-percent chord in the absence of artificial turbulators.

When laminar separation occurs at point 23, it is followed by transition in the highly unstable separated shear layer and may be followed by reattachment at point 24 as shown in FIG. 2. The extent of the bubble 21 depends on the chord Reynolds number for the smooth airfoil.

Figure 7:
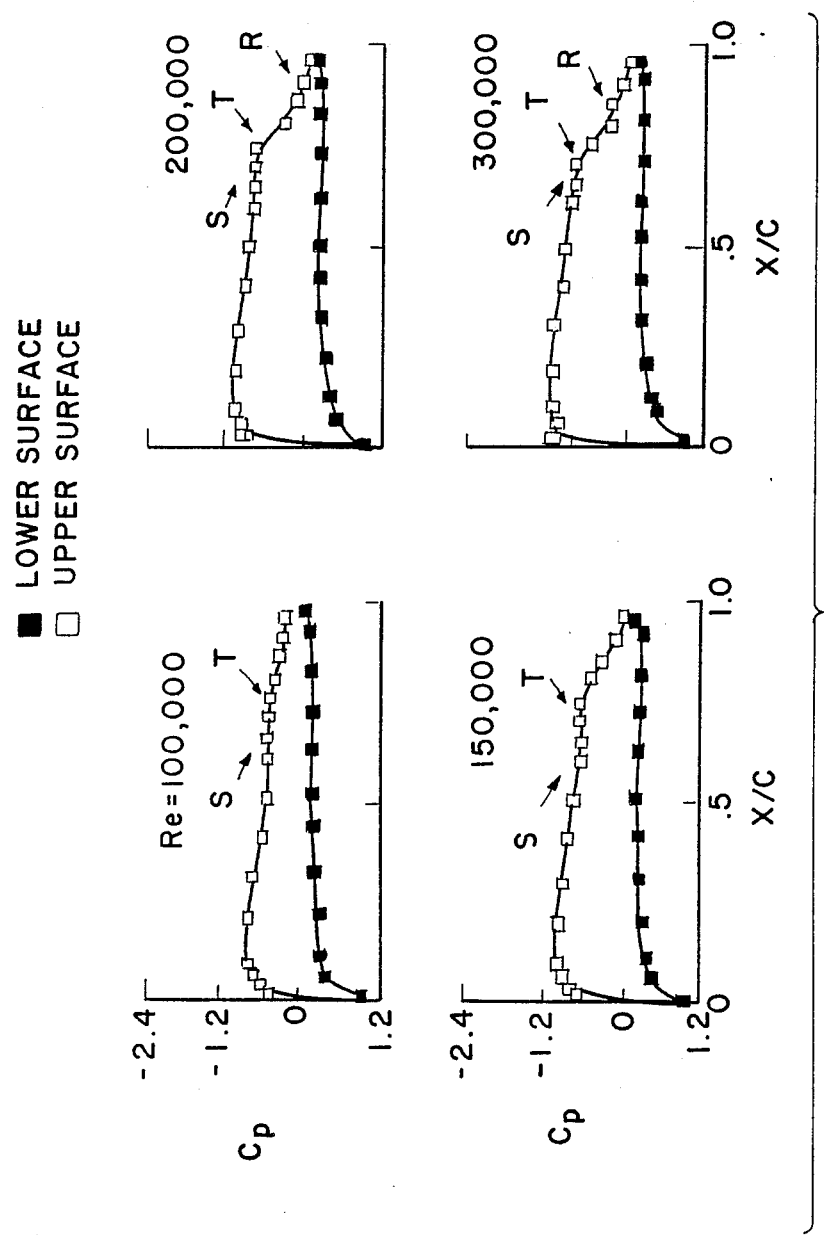
FIG. 7 is a series of diagrams representing pressure distribution over an airfoil at different chord-Reynolds numbers and a constant angle of attack on the same test airfoil.

The series of diagrams of FIG. 7 illustrate the top surface pressure distributions at an angle of attack of 4° for the different chord-Reynolds numbers shown. The location of laminar separation, transition, and turbulent reattachment based on pressure distribution are indicated as points 23, T, and 24, respectively. The location of the points 23, T, and 24 in the pressure distribution measurements were essentially and experimentally verified using a stethoscope.

As described, the sensor elements 27 or 27' are equally spaced from 45- to 95-percent chord and the response of the hot-film sensor elements 27 or 27' to laminar, transitional, and turbulent shear layers is well known. Since the shear layer is laminar on either side of the separation point 23, the output signal (S) from the sensor elements 27 or 27' and as displayed on oscilloscope in the vicinity of laminar separation are similar. The transition is clearly noticeable as shown by the series of wave forms in FIG. 8 which are variable frequency output signals S that represent the fluctuating shear stress at the respective sensor points where the individual elements 27 or 27' are located.

It was discovered that by increasing the gain of the output signals from the sensor elements 27 or 27', an appreciable drop in amplitude in the output signal S from the sensing element 27 or 27' in the laminar separation region indicating an appreciable drop in shear stress fluctuation can be detected. This is shown by FIG. 9 which illustrates the amplified, low frequency wave forms (time history) of the output signals S from the six spaced sensing elements in the previously described group D of sensing elements.

This finding agrees with stethoscope observations used to detect the sound pressure level along the straight line formed by the spaced elements 27 or 27' of the multi-element sensor 26 or 26' and which was found to be more audible in the laminar boundary layer upstream than immediately downstream of the separation point 23 as shown in FIG. 2. There is thus a detectable drop in noise level at the separation point 23 where the fluctuating shear stress is shown to be at a minimum value.

The wave forms illustrated in FIG. 9 are of output signals S from the group D of six spaced sensing elements 27 or 27' at an Rec of 199,900 and an angle of attack of 5° at an increased signal gain of about 30 and filtered to 10-Hz. All output signals S in group D and as illustrated were taken simultaneously.

In addition to the sharp drop in, the amplitude of output signal S at the separation point 23, a 180° phase shift in the low-frequency output signals S occurs across the laminar separation point 23 as clearly shown by the wave forms at $x/c=0.633$ and 0.667 of FIG. 9. While it was also discovered that the location of the laminar-separation point 23 can be varied by changing the angle of attack and/or Rec number, the observed phase shift under any given test conditions always occurs in the sensing element 27 or 27' positioned at the laminar separation point 23.

As shown in FIG. 10, a second and similar 180° phase reversal occurs at the point 24 of turbulent reattachment. Thus, the 180° phase shifts of the output signals S clearly depicts the characteristics of laminar-separation bubble 21 at the upper surface of the airfoil 22 and accurately detects the separation from and reattachment to the upper surface of the airfoil at points 23 and 24 respectively.

This phenomenon of a 180° phase shift across the laminar separation point 23 and the reattachment point 24 is more clearly shown in the waveforms of FIGS. 11(a)-(d) which illustrate the phase and coherence of the cross-correlation of the respective six output signals S from the sensor elements 27 or 27' of group D, as previously described and as shown in FIG. 9.

As shown by waveform 11(a) the phase difference between output signals S from the elements 27 or 27' at points $X/C=0.60$ and $X/C=0.617$ and between the output signals S from points $X/C=0.60$ and $X/C=0.633$ is substantially zero.

However, as shown in FIG. 11(b), a phase shift from nearly zero to 180° occurs when the output signals S from the sensor elements 27 or 27' at points $X/C=0.633$ and $X/C=0.667$ are cross-correlated. This indicates that the elements 27 or 27' at the points $X/C=0.633$ and $X/C=0.667$ are located in flow fields having opposite influences on the dynamic shear stress at the upper surface of the airfoil 22. As the output signals S from the points $X/C=0.633$ and $X/C=0.667$ are 180° out of phase, separation occurred between the points $X/C=0.60$ and $X/C=0.667$. Thus, the phase reversal in conjunction with the indication of a minimum dynamic shear in stress at the point $X/C=0.65$ accurately establishes that laminar separation occurred at the point $X/C=0.65$ which is the separation point 23.

This same phase reversal of output signals S and minimum dynamic shear stress at the points 23 of laminar separation from the airfoil 22 were consistently detected at various angles of attack and chord-Reynolds numbers. The location of transition in such tests was as expected determined by the presence of turbulent bursts and intermittency.

As shown in FIGS. 8 and 11(d) a second phase reversal similar to the one at laminar separation occurs at the point 24 of reattachment which is the point $X/C=0.883$. Thus, the phase shift phenomenon along with minimum dynamic shear stress at the respective points 23 and 24 of separation and reattachment provide a complete and accurate description of the characteristics of the laminar separation bubble 21.

In practicing the invention, as contrasted to the use of conventional three-element hot-film sensors spaced along the span of an airfoil, there is no need to calibrate the respective elements 27 or 27' of the multi-element sensors 26 or 26' as only the phase and phase reversal of the respective output signals S are measured to accurately detect laminar separation and laminar reattachment at points 23 and 24, respectively. It is required only to use sensor elements 27 or 27' reasonably close in resistance value and in general sensitivity characteristics. The sensor elements 27 or 27' need only be positioned in close proximity to each other in a straight line with reasonable accuracy in order to practice the invention.

While embodiments of the invention have been described for use in detecting laminar separation from and reattachment to of an air stream over the surface of an air foil. It is understood the methods and apparatus of the invention maybe used to detect laminar separation from and reattachment to of any fluid streams over surfaces such as fuselages, wings and hulls or the like.

While preferred embodiments have been described in detail, numerous changes and modifications can be made within the principles of the invention which is to be limited only by the appended claims.

We claim:

1. A method of simultaneously detecting laminar separation and reattachment of an airstream to and from a surface of an airfoil comprising the steps of:
   simultaneously sensing the fluctuating dynamic shear stress at a plurality of sensor points spaced along a straight line on said surface;
   simultaneously generating a plurality of low frequency output signals representative of the fluctuating dynamic shear stress at said sensor points; and
   simultaneously comparing all of said low frequency output signals to detect at least two sensor points at which said output signals reverse in phase to thereby simultaneously detect the respective points of laminar separation and reattachment of said airstream to and from said surface of said airfoil.

2. The method as defined in claim 1 wherein said straight line of sensor points extends parallel with said air stream.

3. The method of claim 2 wherein said plurality of output signals are simultaneously generated in a series of groups of output signals, the output signals in each of said respective groups being compared in seriation to detect any sensor point across which said output signal therefrom reverses in phase.

4. The method of claim 1 wherein said plurality of spaced sensor points are arranged in a plurality of straight lines spaced along the span of said airfoil.

5. A method of detecting laminar separation of a fluid stream relative to a surface therein comprising the steps of:
   simultaneously sensing the fluctuating dynamic shear stress with a plurality of sensors spaced along a straight line on said surface;
   simultaneously generating a plurality of output signals from said sensors representative of the fluctuating dynamic shear stress along said straight line; and
   simultaneously comparing all of said output signals to detect a first point along said straight line at which said output signals reverse in phase, said first point of reversal in phase indicating a laminar separation of said fluid stream from said surface.

6. The method of claim 5 including the step of simultaneously detecting a second point along said straight line at which said output signals reverse in phase, said second point of reversal in phase indicating a reattachment of said fluid stream to said surface.

7. The method as defined in claim 6 wherein said straight line of sensors extends parallel with said air stream.

8. The method of claim 7 wherein said plurality of output signals are simultaneously generated in a series of groups of output signals, the output signals in each of said respective groups being compared in seriation to detect any point along said straight line at which said output signals from said sensors reverses in phase.

9. The method of claim 6 wherein said plurality of spaced sensors are arranged in a plurality of straight lines spaced along the span of said airfoil.

* * * * *